US008832537B2

(12) United States Patent
Yamamoto (10) Patent No.: US 8,832,537 B2
(45) Date of Patent: Sep. 9, 2014

(54) INFORMATION MANAGEMENT APPARATUS AND INFORMATION MANAGING METHOD

(75) Inventor: Hiroshi Yamamoto, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 579 days.

(21) Appl. No.: 13/143,737

(22) PCT Filed: Dec. 22, 2009

(86) PCT No.: PCT/JP2009/071347
§ 371 (c)(1),
(2), (4) Date: Jul. 8, 2011

(87) PCT Pub. No.: WO2011/077519
PCT Pub. Date: Jun. 30, 2011

(65) Prior Publication Data
US 2011/0283056 A1 Nov. 17, 2011

(51) Int. Cl.
| G06F 11/00 | (2006.01) |
| G06F 7/02 | (2006.01) |
| F02D 41/24 | (2006.01) |
| F02D 41/26 | (2006.01) |
| G06F 11/14 | (2006.01) |

(52) U.S. Cl.
CPC .......... *F02D 41/2406* (2013.01); *F02D 41/249* (2013.01); *F02D 41/2422* (2013.01); *F02D 41/266* (2013.01); *G06F 11/1441* (2013.01)
USPC ............ 714/799; 714/704; 714/706; 714/819

(58) Field of Classification Search
USPC .......................... 714/704, 706, 746, 799, 819
See application file for complete search history.

(56) References Cited

U.S. PATENT DOCUMENTS 6,934,902 B2 *  8/2005  Hara et al. ..................... 714/757
7,716,566 B2 *  5/2010  Lee et al. ....................... 714/821
(Continued)

FOREIGN PATENT DOCUMENTS

JP    2001 84002    3/2001
JP    2003 015929   1/2003
(Continued)

OTHER PUBLICATIONS

Dubois-Felsmann, G. P.; Chen, E.; Kolomensky, Yu; Metzler, S.; Samuel, A.; Yang, S., "Flexible processing framework for online event data and software triggering," Nuclear Science, IEEE Transactions on , vol. 47, No. 2, pp. 353,357, Apr. 2000.*

(Continued)

*Primary Examiner* — Cynthia Britt
(74) *Attorney, Agent, or Firm* — Oblon, Spivak, McClelland, Maier & Neustadt, L.L.P.

(57) ABSTRACT

An information management apparatus for managing data includes a rewritable nonvolatile memory, and a memory controller configured to control inputting information into and outputting information from the nonvolatile memory. The memory controller overwrites a data, which includes a first validity check information, a first data body, a second validity check information, a second data body having the same data as the first data body and a third validity check information arranged in this order, in a designated address area in the nonvolatile memory when the memory controller performs a writing control in which the memory controller writes data in the nonvolatile memory.

14 Claims, 9 Drawing Sheets

(56) References Cited

U.S. PATENT DOCUMENTS

2007/0162621 A1* 7/2007 Condorelli et al. ............... 710/1
2013/0111115 A1* 5/2013 Iliadis ........................... 711/103
2013/0227379 A1* 8/2013 Gupta et al. .................. 714/807

FOREIGN PATENT DOCUMENTS

| JP | 2006 079522 | 3/2006 |
| JP | 2008 033801 | 2/2008 |
| JP | 2008 071223 | 3/2008 |
| JP | 2008 537192 | 9/2008 |
| JP | 2009 289200 | 12/2009 |

OTHER PUBLICATIONS

Zarandi, H.-R.; Miremadi, S.-G.; Sarbazi-Azad, H., "Fault detection enhancement in cache memories using a high performance placement algorithm," On-Line Testing Symposium, 2004. IOLTS 2004. Proceedings. 10th IEEE International , vol., No., pp. 101,106, Jul. 12-14, 2004.*

Mitra, S; McCluskey, E.J., "Diversity techniques for concurrent error detection," Quality Electronic Design, 2001 International Symposium on , vol., No., pp. 249,250, 2001.*

International Search Report issued Jul. 27, 2010 in PCT/JP09/071347 filed Dec. 22, 2009.

* cited by examiner

INFORMATION MANAGEMENT APPARATUS AND INFORMATION MANAGING METHOD

TECHNICAL FIELD

The present invention relates to an information management apparatus which manages information by using a rewritable nonvolatile memory and an information managing method by using a computer rewritable nonvolatile memory.

BACKGROUND ART

Recently, a process has been implemented where a learning value obtained through vehicle control is stored in a nonvolatile memory at the end of controlling a vehicle system and the learning value is then read from the nonvolatile memory and later to be used for vehicle control when the vehicle system is to be started. An EEPROM (Electronically Erasable and Programmable Read Only Memory) is preferably used as the nonvolatile memory. A CD-R, a CD-RW, a DVD-R, a DVD-RW, a hard disk, etc. may also be used as the nonvolatile memory.

In an information management apparatus which utilizes this type of process, data of the learning value may be stored partially in a case where an accident such as a power shutdown or the like occurs when the data is being stored in the nonvolatile memory. As a result, a problem occurs in that it becomes impossible to use the learning value which has been collected.

This problem occurs especially in a case where the information management apparatus is mounted on a vehicle. In this case, a battery of the vehicle is replaced by a user of the vehicle or a repair shop shortly after the vehicle is stopped. As a result, a writing process of a data block of the nonvolatile memory may not be completely finished. A similar problem may occur not only in the case where the apparatus is mounted on the vehicle, but also in the case where there is an apparatus or a system, such as a cellular phone or the like, where a battery is detachable.

In this connection, an invention of an information management apparatus in which data is stored in both a management area sector and a backup sector that are formed in a flash memory is disclosed (see, e.g., Patent Document 1).

According to this information management apparatus, when update data is written into the apparatus, data stored in the backup sector is deleted first, and then a copy of the data stored in the management area sector is written into the backup sector. Further, the data stored in the management area sector is deleted after a signature of the management area sector is cleared, and finally the update data is written into the management area sector. A signature is written into the management area sector when the update data is written into the management area sector.

When the data is read from the flash memory, it is determined whether the signature written in the management area sector is correct or not by comparing the signature with fixed data. If the signature is not correct, it is determined whether a signature written in the backup sector is correct or not. In a case where only the signature written in the backup area is correct, the data stored in the backup sector is written into the management area sector (see FIG. 9 of the patent document 1).

An invention of a data duplexing system in which data is written and stored into a master memory apparatus and a slave memory apparatus is disclosed (see, e.g., Patent Document 2). This system includes a status table in a control apparatus. A writing flag is set in an area of the master memory apparatus in the table when the data is being written into the master memory apparatus. A written flag is set in an area of the slave memory apparatus in the table when the data is being written into the slave memory apparatus. The duplexing system detects an accident when the data is being written in a state where the flag is set in the area of the master memory apparatus or the slave memory apparatus.

Patent Document 1: Japanese Laid-Open Patent Application No. 2008-71223

Patent Document 2: Japanese Laid-Open Patent Application No. 2006-79522

DISCLOSURE OF INVENTION

Problem to be Solved by the Invention

However, according to the apparatus of patent document 1, since a writing process of the update data is completed through many access processes such as a data delete process, a data write process, a signature clear process, a data delete process and a data write process, the processing time may become longer. This is because the nonvolatile memory requires more access time than a register, a cache, a RAM, etc.

Therefore, in a case where the apparatus disclosed in patent document 1 is applied to a control apparatus of a vehicle, for example, it takes a long time to shut down a vehicle system. Thus, a user, such as a driver or the like, may suffer.

The system disclosed in patent document 2 includes the status table in the control apparatus, and it is necessary to store the status table in a nonvolatile memory. Thus, the cost of the system as a whole is increased. Further, the cost of the system is increased, since the system includes the master memory apparatus and the slave memory apparatus. Furthermore, the processing time becomes longer, since it is necessary for the system to access both memories.

The present invention solves the problems as described above. It is an aspect of the present invention to provide an information management apparatus and an information managing method that can write data into a nonvolatile memory at high speed and suppress loss of data.

Means for Solving the Problems

In order to achieve the aspect as described above, an embodiment of the present invention provides an information management apparatus for managing data which includes a rewritable nonvolatile memory and a memory controller configured to control inputting information into and outputting information from the nonvolatile memory, wherein the memory controller overwrites a data, which includes a first validity check information, a first data body, a second validity check information, a second data body having the same data as the first data body and a third validity check information arranged in this order, in a designated address area in the nonvolatile memory when the memory controller performs a writing control in which the memory controller writes data in the nonvolatile memory.

Effects of the Invention

In accordance with the present invention, an information management apparatus and an information managing method that can write data into a nonvolatile memory at high speed and can suppress loss of data can be provided.

BEST MODE FOR CARRYING OUT THE INVENTION

In the following, preferred embodiments of the present invention are described with reference to the drawings.

An information management apparatus and an information managing method according to the present invention are preferably applied to a vehicle control apparatus that stores a learning value obtained through vehicle control into a nonvolatile memory at the end of controlling a vehicle system, reads the learning value from the nonvolatile memory and uses it for the vehicle control when the vehicle system is started.

Herein, the information management apparatus and the method for managing information according to the present invention is applied not only to the vehicle control apparatus which controls devices mounted on the vehicle, but is also applied to a device or a system such as a control apparatus mounted on a mode of transportation such as a ship, an air plane or the like, a personal computer, a cellular phone, a television, a game machine etc. Hereinafter, embodiments in which the information management apparatus and the method for managing information are applied to the vehicle control apparatus will be described.

Embodiment

In the following, the information management apparatus and the method for managing information according to one embodiment of the present invention are described with reference to the drawings.

<Basic Configuration>

Figure 1:
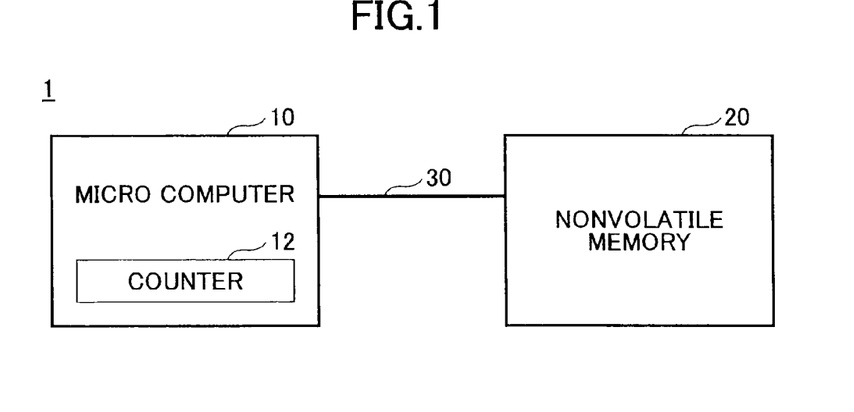
FIG. 1 shows an example of system configuration of an information management apparatus according to one embodiment of the present invention.

FIG. 1 shows an example of system configuration of an information management apparatus 1 according to one embodiment of the present invention. The information management apparatus includes a micro computer 10 and a rewritable nonvolatile memory 20 as a main component. The nonvolatile memory 20 may be an EEPROM, for example. A CD-R, a CD-RW, a DVD-R, DVD-RW, a DVD-RAM, a hard disk or the like may also be used as the nonvolatile memory 20. The micro computer 10 and the nonvolatile memory 20 are connected by a communication wire 30, and transmit and receive information under a serial communication protocol.

Figure 2:
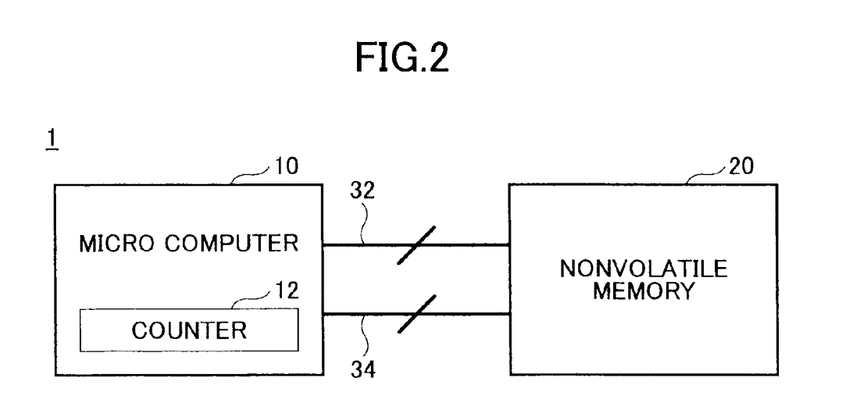
FIG. 2 shows another example of the system configuration of the information management apparatus according to the one embodiment of the present invention.

Herein, an embodiment of a connection between the micro computer 10 and the nonvolatile memory 20 is not limited to the one as shown in FIG. 1. FIG. 2 shows another example of the system configuration of the information management apparatus 1 according to the embodiment of the present invention. As shown in FIG. 2, the micro computer 10 and the nonvolatile memory 20 are connected by a bus system which includes a address bus 32 and a data bus 34.

The micro computer 10 includes a CPU (Central Processing Unit), a RAM (Random Access Memory), a ROM (Read Only Memory), an I/O, a register, a cache memory or the like. The micro computer 10 includes a built-in counter 12.

Detection values of sensors, such as an accelerator pedal position sensor, a speed sensor, a acceleration sensor, a crank angle sensor or the like, that detect the status of a vehicle are input into the micro computer 10. The micro computer 10 outputs control signals for controlled devices, such as a throttle motor, an igniter, a transmission, a driving motor or the like, based on the detection values that are input from the sensors. As a basic example, the micro computer 10 determines a target torque of an engine based on a map or a formula which includes an accelerator pedal position and a speed of the vehicle as input parameters, and controls the throttle motor and the transmission so that the engine outputs a torque that is equal to the target torque.

As described above, for example, the micro computer 10 constitutes a control apparatus which controls the engine and the transmission, the micro computer 10 may constitute a control apparatus for controlling an electronic control brake apparatus, a control apparatus for controlling a power steering apparatus, a vehicle stability control apparatus such as a VSC (Vehicle Stability Control), VDIM (Vehicle Dynamics Integrated Management) or the like, and a control apparatus for controlling a navigation apparatus. Further, the micro computer 10 may constitute an integrated control apparatus which has the functions of the control apparatuses as described above.

The micro computer 10 learns control information through controls of devices mounted on the vehicle. As for learning the control information, various types of techniques are known. As an example of learning the control information of the transmission, a technique which controls and optimizes shift timing in accordance with individual differences or abrasion of constructive members of the transmission is known. The micro computer 10 monitors the occurrence of a shift shock based on an output of the accelerator sensor and learns an appropriate activation timing of a lock-up clutch etc.

In a case where the micro computer 10 constitutes a control apparatus which performs an automatic deceleration control based on the location of the vehicle, i.e. in a case where the micro computer 10 controls down shifting and braking in front of a curve or a toll gate by verifying map data and the location of the vehicle, the micro computer 10 learns that deceleration is not performed in front of a toll gate which does not actually exist (has been abandoned) but is included in the map data. The micro computer 10 can be set not to perform automatic deceleration control at the location.

It is possible to learn control information of various controlled devices when the micro computer 10 controls devices mounted on the vehicle. There is no limitation for the devices to which the present invention can be applied.

The learning value which has been learned by the micro computer 10 when the micro computer 10 is controlling the devices, is stored in the nonvolatile memory 20 at the end of controlling a vehicle system. The end of controlling the vehicle system may be, for example, when a driver of the vehicle operates a key from the ACC-on position to the ACC-off position. A power is supplied from a battery mounted on the vehicle to the micro computer 10 and other control apparatuses while data transmission from the micro computer 10 to the nonvolatile memory 20 is being performed.

The micro computer 10 reads the learning value stored in the nonvolatile memory 20 and uses it thereafter when the vehicle system is started. The start of the vehicle system may be, for example, when the driver operates the key from the ACC-off position to the ACC-on position. Accordingly, it is possible to maintain a sequentiality of control, and to control the devices mounted on the vehicle in accordance with conditions of the vehicle.

<Characteristic Process>

Herein, according to the control apparatuses mounted on the vehicle, a writing process may not be completely finished in a case where a battery of the vehicle is replaced by a user of the vehicle or a repair shop shortly after the vehicle is stopped. As a result, the learning value is stored partially in the nonvolatile memory 20, and the partially stored leaning value is carried over to the next use of the vehicle. There is a case in that the data may be compromised. In this case, it is difficult for the micro computer 10 to use the learning value, which has been collected, thereafter.

Accordingly, the information management apparatus 1 according to the present embodiment suppresses loss of the data by executing a characteristic process as described below.

<Writing Control>

The micro computer 10 repeatedly overwrites data which includes a matching keyword A, data block 1, a matching keyword B, data block 2 and a matching keyword C that are arranged in this order into a designated address area 20A in the nonvolatile memory 20 when the micro computer 10 writes the learning values which has been collected through the control of the devices mounted on the vehicle.

Herein, the matching keyword A corresponds to a first validity check information in the claims, the matching keyword B corresponds to a second validity check information in the claims and the matching keyword C corresponds to a third validity check information, respectively.

Data block 1 and data block 2 have the same data which constitutes a set of the learning values that the micro computer 10 has learned through the control of the devices mounted on the vehicle. Data block 1 corresponds to a first data body in the claims and a data block 2 corresponds to the second data body in the claims.

Figure 3:
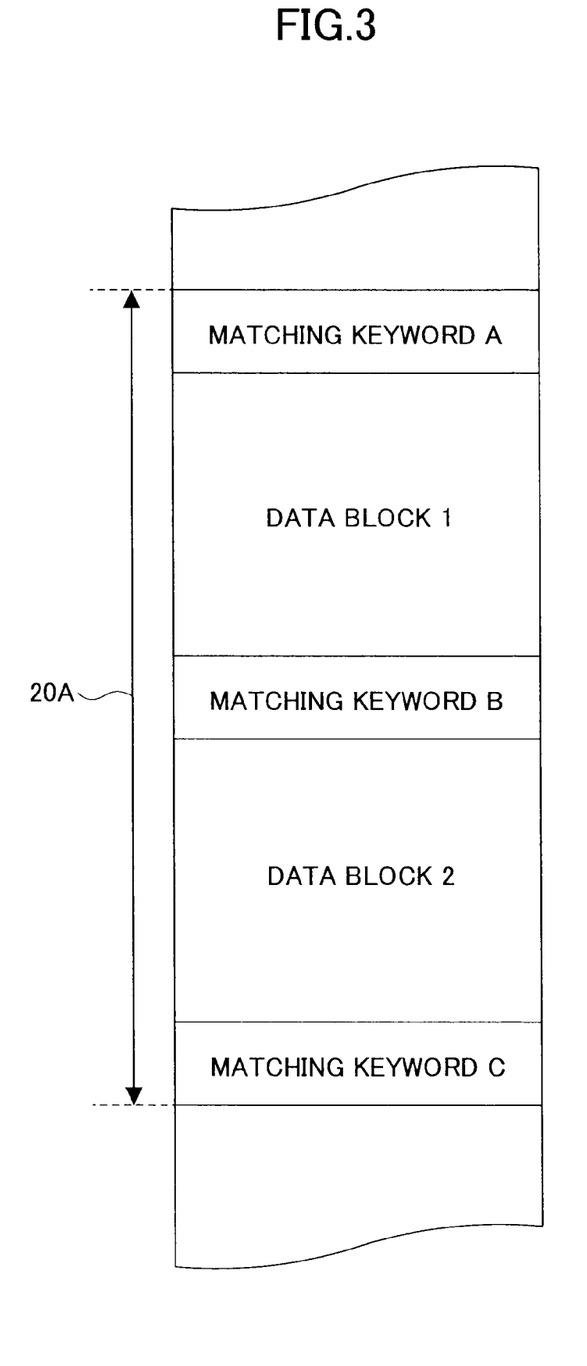
FIG. 3 shows an image which indicates a designated address area in the nonvolatile memory.

FIG. 3 shows an image which indicates the designated address area 20A in the nonvolatile memory 20. Herein, the designated address area 20A is a contiguous area as a physical address. As shown in FIG. 3, the matching keyword A to the matching keyword C are arranged contiguously in the designated address area 20A.

The micro computer 10 arranges the learning values in the RAM at the end of controlling the vehicle system, and then generates and prepares the contiguous data in a designated area in the RAM as shown in FIG. 3. Then the micro computer 10 transfers the data stored in the designated area in the RAM to the designated address area 20A in the nonvolatile memory 20 in block (by designating only a starting address). Herein, the data may be divided and transferred sequentially in a case where the size of the data is in excesses of the maximum size of the data that the nonvolatile memory 20 can receive at one time. In this case, the micro computer 10 repeatedly executes a transmitting process whereby the micro computer 10 transmits a unit of data and transmits a next unit of data when the micro computer 10 receives a response indicating completion of the writing process from the nonvolatile memory 20.

It becomes possible to write data in the nonvolatile memory 20 at high speed by executing a data transferring process in block as described above. In general, an access speed of the nonvolatile memory 20 is slower than that of a cache memory, a RAM or the like. It becomes possible to enhance the speed of the writing process of data by executing the data transferring batch process.

The matching keywords A to C constitute count values that are generated by the counter 12, for example, and are set to the same value. Thus, in a case where the count values are set to 20, the data which is going to be written in the nonvolatile memory 20 includes data indicating the count value of 20, data block 1, data indicating the count value of 20, data block 2 and a data indicating the count value of 20 arranged in this order.

It becomes possible to suppress (minimize) the loss of the data by writing data in the nonvolatile memory 20 in a manner as described above. Hereinafter, the reason thereof will be described.

As described above, according to the information management apparatus 1 of the present embodiment, there is a possibility of the occurrence of an accident such as power shut-down or the like when the present data is being written. It depends on the time at which the accident occurs during the present writing process that determines whether any of data block 1 and/or block data 2 are written in an incomplete manner (or are possibly compromised) or not.

Figure 4:
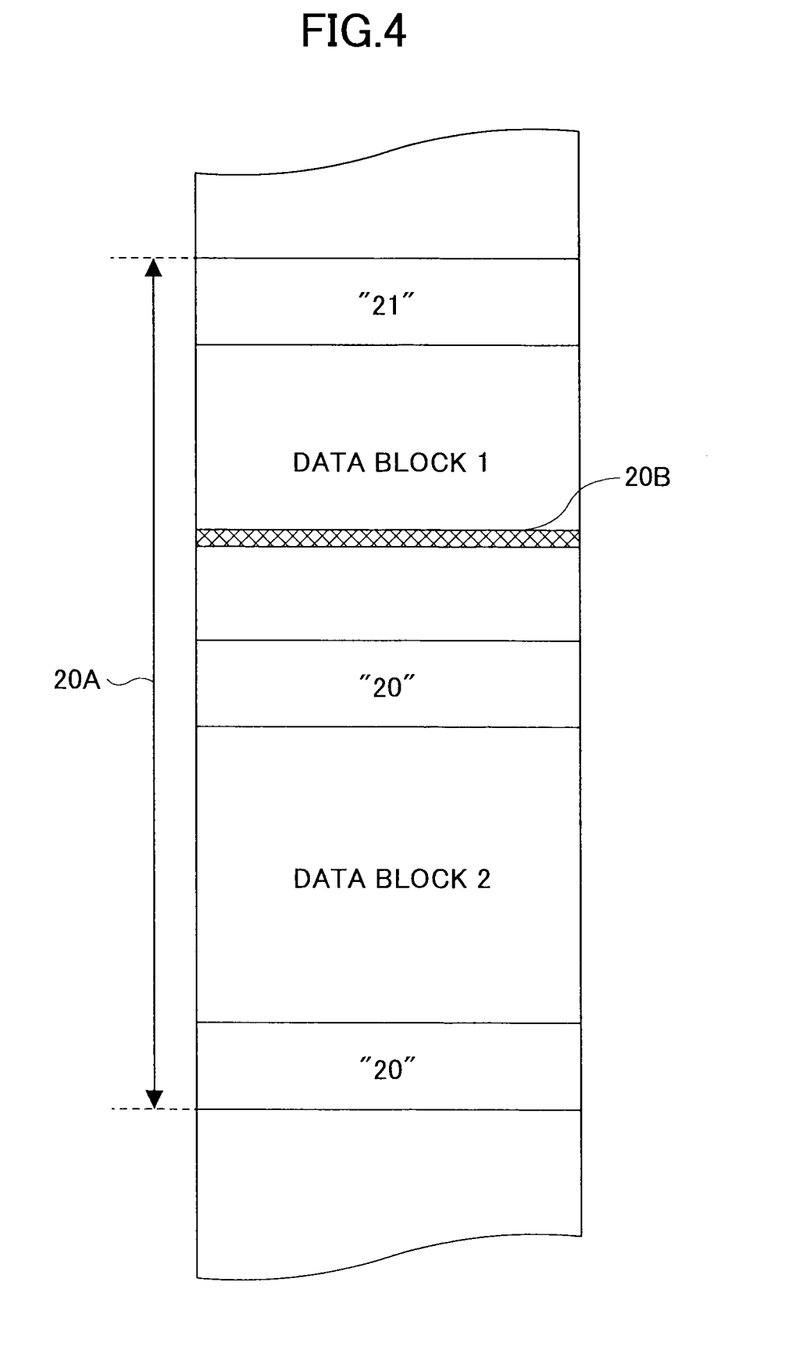
FIG. 4 shows an image which indicates data stored in the designated address area in the nonvolatile memory in a case where power shut-down or the like occurs within a writing process of a data block.
Figure 5:
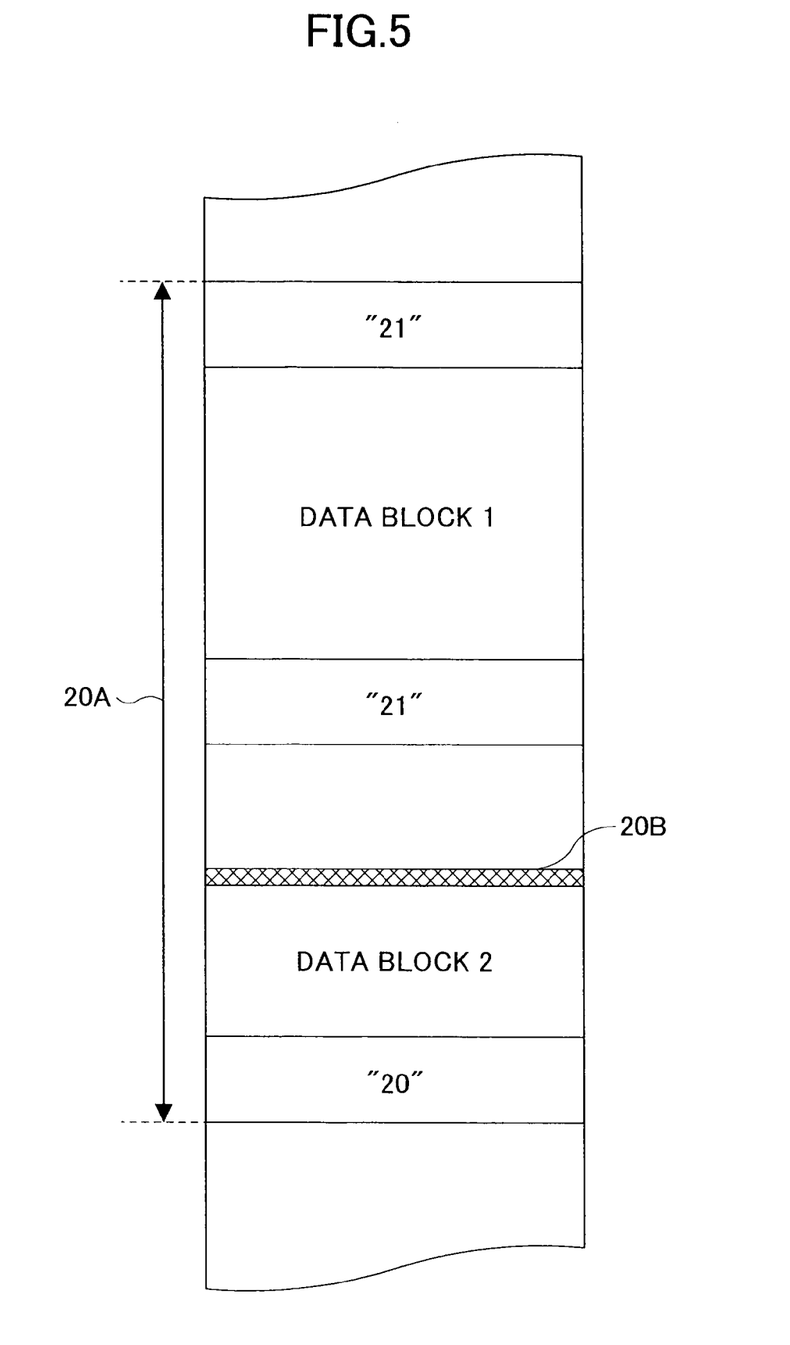
FIG. 5 shows an image which indicates data stored in the designated address area in the nonvolatile memory in a case where the power shut-down or the like occurs within a writing process of the data block.

FIG. 4 shows an image which indicates data stored in the designated address area 20A in the nonvolatile memory 20 in a case where the power shut-down or the like occurs during a present writing process of data block 1. In FIG. 4, numeral 20B indicates data written at a time at which the power shut-down or the like has occurred. In FIG. 4 and FIG. 5 as described later, the count value is set to 20 when the previous complete writing process was performed, and the count value of the present writing process is set to 21.

As shown in FIG. 4, only the matching keyword A has the value of 21, and the matching keywords B and C have the values of 20 in a case where the power shut-down has occurred during the present writing process of data block 1. Thus, it turns out that the power shut-down occurred during the present writing process of data block 1 if the matching keyword A does not correspond to the other matching keyword.

In this case, the micro computer 10 selects data block 2 and uses it for controlling the vehicle system when the vehicle system is started the next time. Since last completed data block 2 includes the data which was written in the last completed writing control, it is impossible to reflect the data of the present writing control. It is possible to suppress data loss for only a single writing control.

FIG. 5 shows an image which indicates data stored in the designated address area 20A in the nonvolatile memory 20 in a case where the power shut-down or the like has occurred during a present writing process of data block 2. In FIG. 5, the numeral 20B indicates data written at a time at which the power shut-down or the like has occurred.

As shown in FIG. 5, the matching keywords A and B have the value of 21, and only the matching keyword C has the values of 20 in a case where the power shut-down has occurred during the present writing process of data block 2. Thus, it turns out that the power shut-down has occurred during the present writing process of data block 2 if the matching keyword C does not correspond to the other matching keyword.

In this case, the micro computer 10 selects data block 1 and uses it for controlling the vehicle system when the vehicle system is started the next time.

Herein, any one of the data blocks may be selected in a case where all of the matching keywords A to C correspond to each other. In this case, data block 1 may be selected, as a matter of convenience.

Thus, the information management apparatus 1 of the present embodiment can suppress data loss by storing the data, which includes the matching keyword A, data block 1, the matching keyword B, data block 2 and the matching keyword C that are arranged in this order, into the designated address area 20A in the nonvolatile memory 20. Since the information management apparatus 1 of the present embodiment overwrites the contiguous data as described above into the same address area, the information management apparatus 1 can perform a backup function as described hereinafter.

Figure 6:
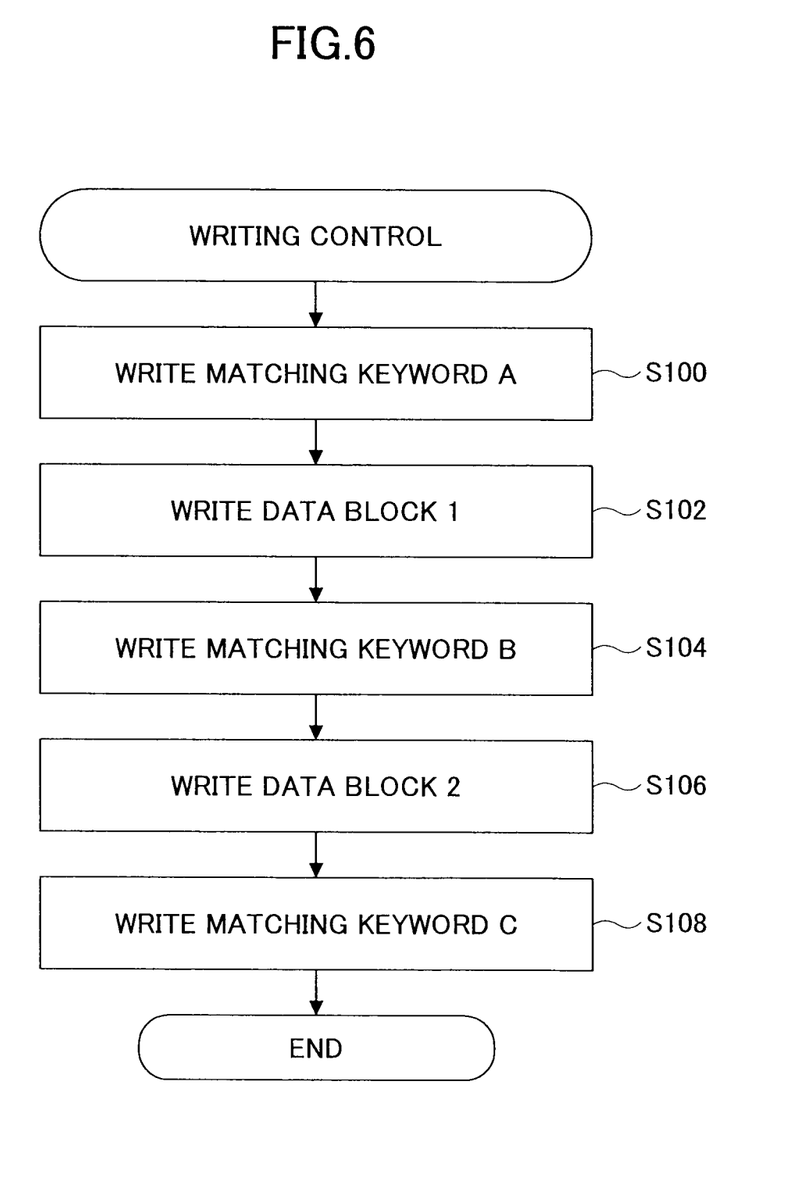
FIG. 6 shows a process flow of the writing control which is executed by a micro computer.

FIG. 6 shows a process flow of the writing control which is executed by the micro computer 10. This flow is executed at the end of controlling the vehicle system, as described above.

First, the micro computer 10 writes the matching keyword A in the nonvolatile memory 20 (S100). Then the micro computer 10 writes data block 1 in the nonvolatile memory 20 (S102). Then the micro computer 10 writes the matching keyword B in the nonvolatile memory 20 (S104). Then the micro computer 10 writes data block 2 in the nonvolatile memory 20 (S106). Finally, the micro computer 10 writes the matching keyword C in the nonvolatile memory 20 (S108).

<Reading Control>

As described above, the micro computer 10 selects any one of data block 1 and data block 2 based on a matching condition of the matching keywords A to C with the other keywords when the micro computer 10 reads the learning value (the data block) from the nonvolatile memory 20. The micro computer 10 uses the data block selected from the data blocks 1 and 2.

According to the present embodiment, the micro computer 10 selects any one of data block 1 and data block 2 based on sameness of the keywords A to C with the other keywords, since the micro computer 10 writes the same count values generated by the counter 12 in the nonvolatile memory 20 as the matching keywords A to C in the writing control.

Figure 7:
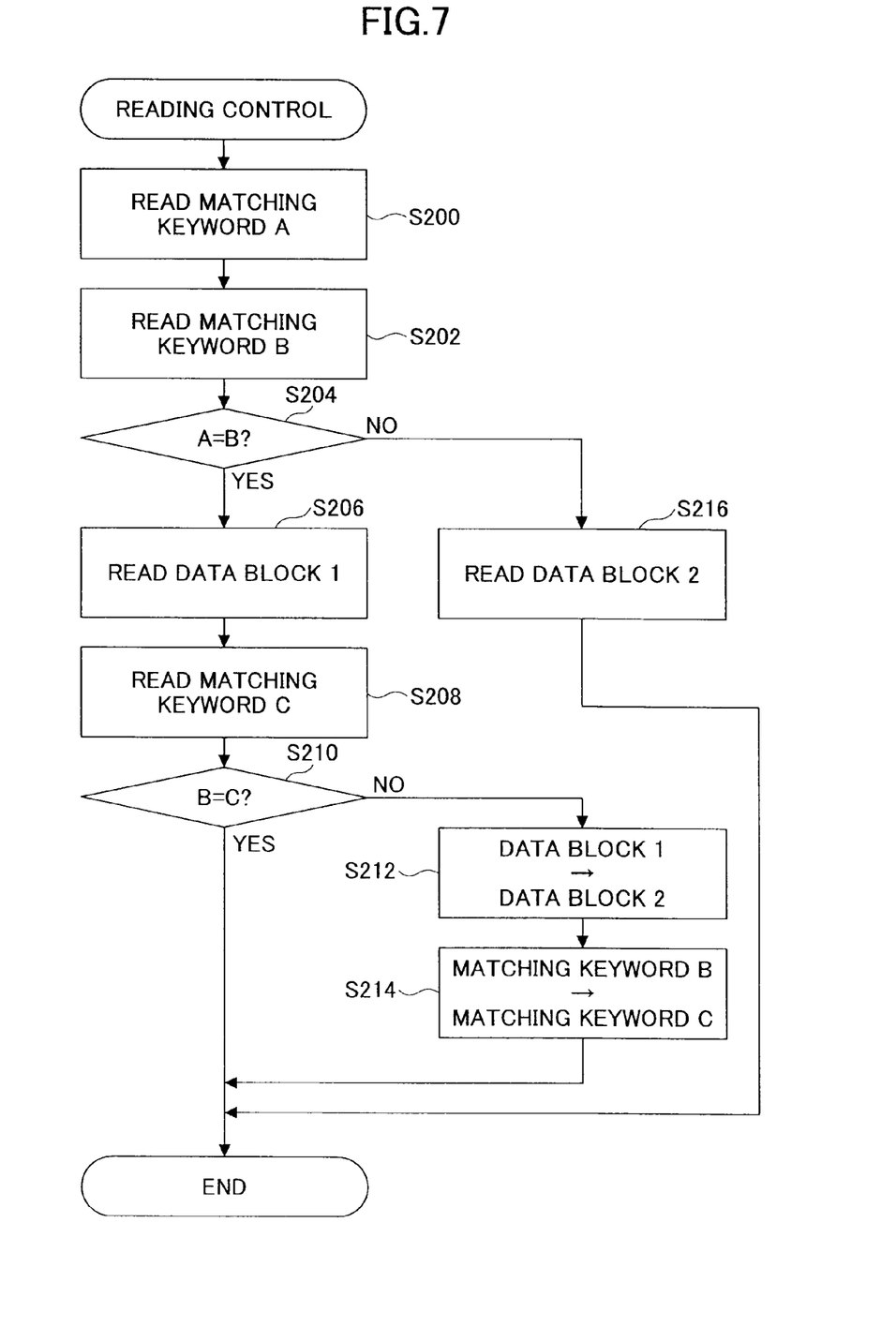
FIG. 7 shows a process flow of a reading control which is executed by the micro computer.

FIG. 7 shows a process flow of the reading control which is executed by the micro computer 10. As described above, this flow is executed when the vehicle system is started.

First, the micro computer 10 reads the matching keyword A from the nonvolatile memory 20 (S200). Then the micro computer 10 reads the matching keyword B from the nonvolatile memory 20 (S202). The keywords A and B that are read at steps S200 and S202 are stored into the register or the like in the micro computer 10.

Then the micro computer 10 determines whether the matching keyword A and the matching keyword B correspond to each other (S204).

If the matching keyword A and the matching keyword B correspond to each other, the micro computer 10 reads data block 1 (S206), and then reads the matching keyword C (S208). Data block 1 which is read at S206 is stored into the cache memory, the RAM or the like. The keyword C which is read at 5208 is stored into the resister or the like in the micro computer 10.

Further, the micro computer 10 determines whether the matching keyword B (or the keyword A) and the matching keyword C correspond to each other (S210). The micro computer 10 finishes one routine of the present flow, if the matching keyword B (or the matching keyword A) and the matching keyword C correspond to each other. In this case, data block 1 which is read at S206 is used for controlling the vehicle system.

On the contrary, if the keyword B (or the keyword A) and the keyword C do not correspond to each other, the micro computer 10 replaces data block 2 by data block 1 (S212). This is because it is determined that the power shut-down or the like has occurred during the writing process of data block 2 when the matching keyword C does not correspond to the other keywords, as described above. Specifically, the micro computer 10 recovers data block 2 by writing data block 1 read at S206 into the address area in the nonvolatile memory 20 in which data block 2 is stored.

Further, the micro computer 10 replaces the matching keyword C by the matching keyword B (or the matching keyword A) (S214). Through these processes, data block 2 is recovered, and the matching keywords A to C correspond to each other again.

If the keyword A and the keyword B do not correspond to each other at S204, the micro computer 10 reads data block 2 (S216). Data block 2 read at S216 is stored into the cache memory, the RAM or the like. In this case, the data block read at 5216 is used (selected) for control, and the backup function which is performed by data block 2 is realized.

If the matching keyword A does not correspond to the other matching keyword, the micro computer 10 can omit a correction process of the matching keyword as shown in S214. For example, in the present reading control, the matching keywords (A, B, C) are assumed to be (21, 20, 20) or the like. In this case, if the power shut-down or the like occurs during the writing process of data block 1 in the next writing control, the matching keywords (A, B, C) become (22, 20, 20). As a result, data block 2 is selected.

On the contrary, if the power shut-down or the like occurs during the writing process of data block 2 in the next writing control, the matching keywords (A, B, C) become (22, 22, 20). As a result, data block 1 is selected, and data block 2 is recovered.

In both cases, the data block of which the writing process has finished normally is selected. Thus particular problem as described above does not occur.

However, if the matching keyword C does not correspond to the other matching keyword, the matching keywords (A, B, C) is assumed to be (21, 21, 20) or the like, in this reading control. In this case, if the power shut-down or the like occurs during the writing process of data block 1 in the next writing control, the matching keywords (A, B, C) become (22, 21, 20).

In this case, the micro computer 10 can not determine which one to select from data block 1 and data block 2. Thus, the micro computer 10 performs a correction process of the matching keyword only in a case where the matching keyword C does not correspond to the other matching keyword.

The information management apparatus 1 of the present embodiment, as described above, can suppress data loss by overwriting data, which includes the matching keyword A, data block 1, the matching keyword B, data block 2 and the matching keyword C that are arranged in this order, into the designated address area 20A in the nonvolatile memory 20.

Since the information management apparatus 1 of the present embodiment executes a simple process in which the contiguous data is simply written into the designated address area 20A in the nonvolatile memory 20, the information management apparatus 1 can finish the writing control by data transferring batch process. As a result, it is possible to write data in the nonvolatile memory 20 at high speed.

Thus, the information management apparatus 1 of the present embodiment can write data in the nonvolatile memory 20 at high speed and suppress data loss.

Further, since the information management apparatus 1 of the present embodiment stores the data in the single nonvolatile memory 20 and does not require another nonvolatile memory or the like in the micro computer 10, it is possible to reduce a cost of the information management apparatus 1.

Herein, the process flow as shown in FIG. 6 corresponds to a data writing step in the claims. The process flow as shown in FIG. 7 corresponds to a data reading step in the claims. The processes of S206 and S216 correspond to a data selecting step in the claims. The processes of S204 and S210 correspond to a determining step in the claims. The process of S212 corresponds to a data recovering step in the claims.

Although various embodiments for carrying out the invention are described above, the present invention is not limited to these embodiments, but variations and modifications may be made without departing from the scope of the present invention.

For example, the values of the matching keywords A to C may not be set to the same value. In this case, for example, three values that have some sort of correlation may be set to the matching keywords A to C. In a case where the count value generated by the counter 12 is used for setting the matching keywords, and the count value is 3, the matching keywords (A, B, C) may be set to (3, 30, 300), (3, 9, 27) or the like. If the matching keywords are not limited to numerals, the matching keywords may be set to text information such as (3A, 3B, 3C) or the like.

Although the counter 12 is described as an increment counter, the counter 12 may be a decrement counter.

Figure 8:
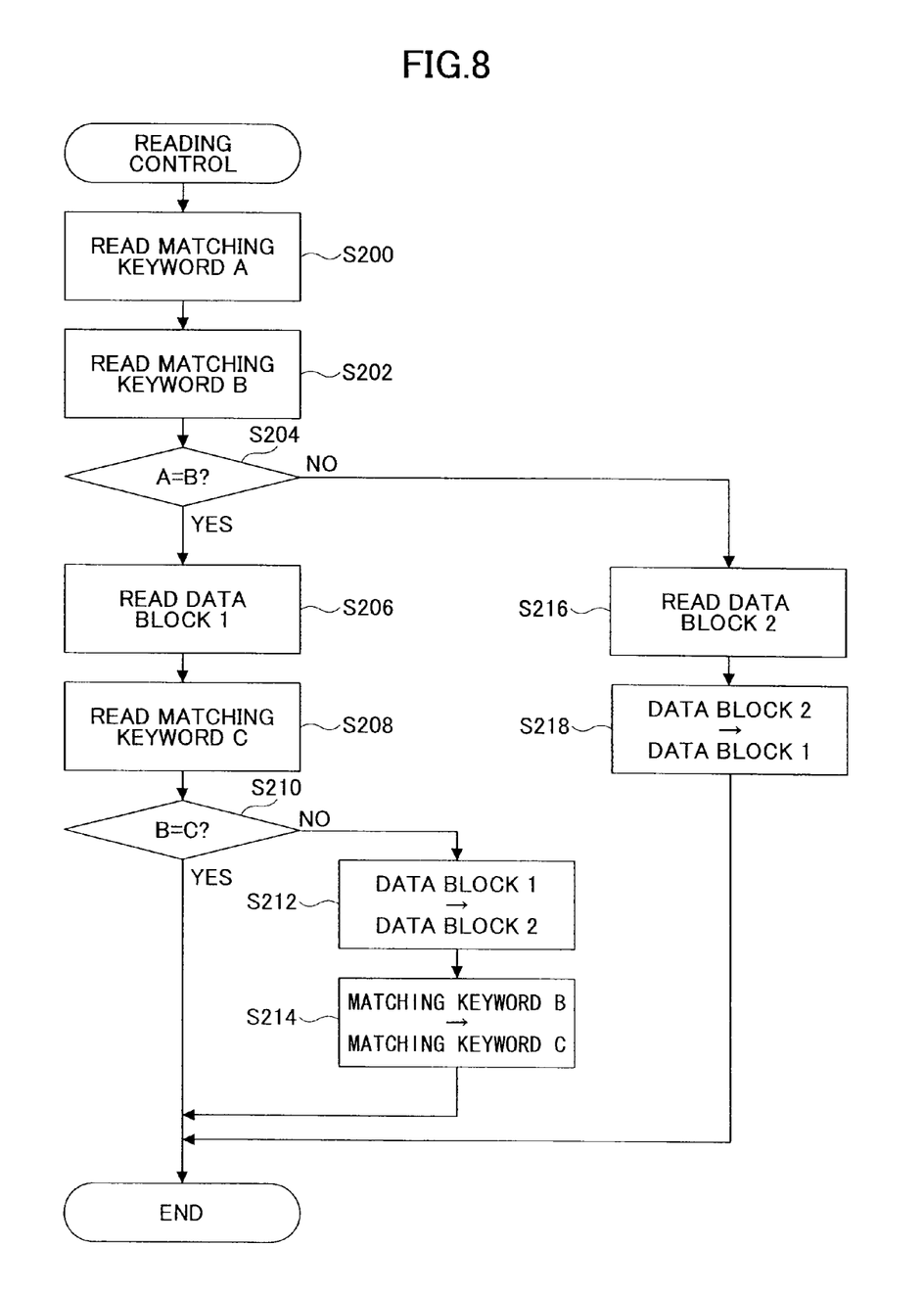
FIG. 8 shows another example of a process flow of the reading control which is executed by the micro computer.

Although, data block 1 is not recovered in a case where data block 2 is selected, as described above, data block 1 may be recovered in a case where data block 2 is selected, considering a cause besides the power shut-down. FIG. 8 shows a process flow of the case described above. According to FIG. 8, the micro computer 10 reads data block 2 (S216) and replaces data block 1 by data block 2 (S218), in a case where the matching keyword A and the matching keyword B do not correspond to each other.

Even though the number of times of memory access increases in the reading control, by doing this, it becomes possible to suppress data loss more effectively.

Figure 9:
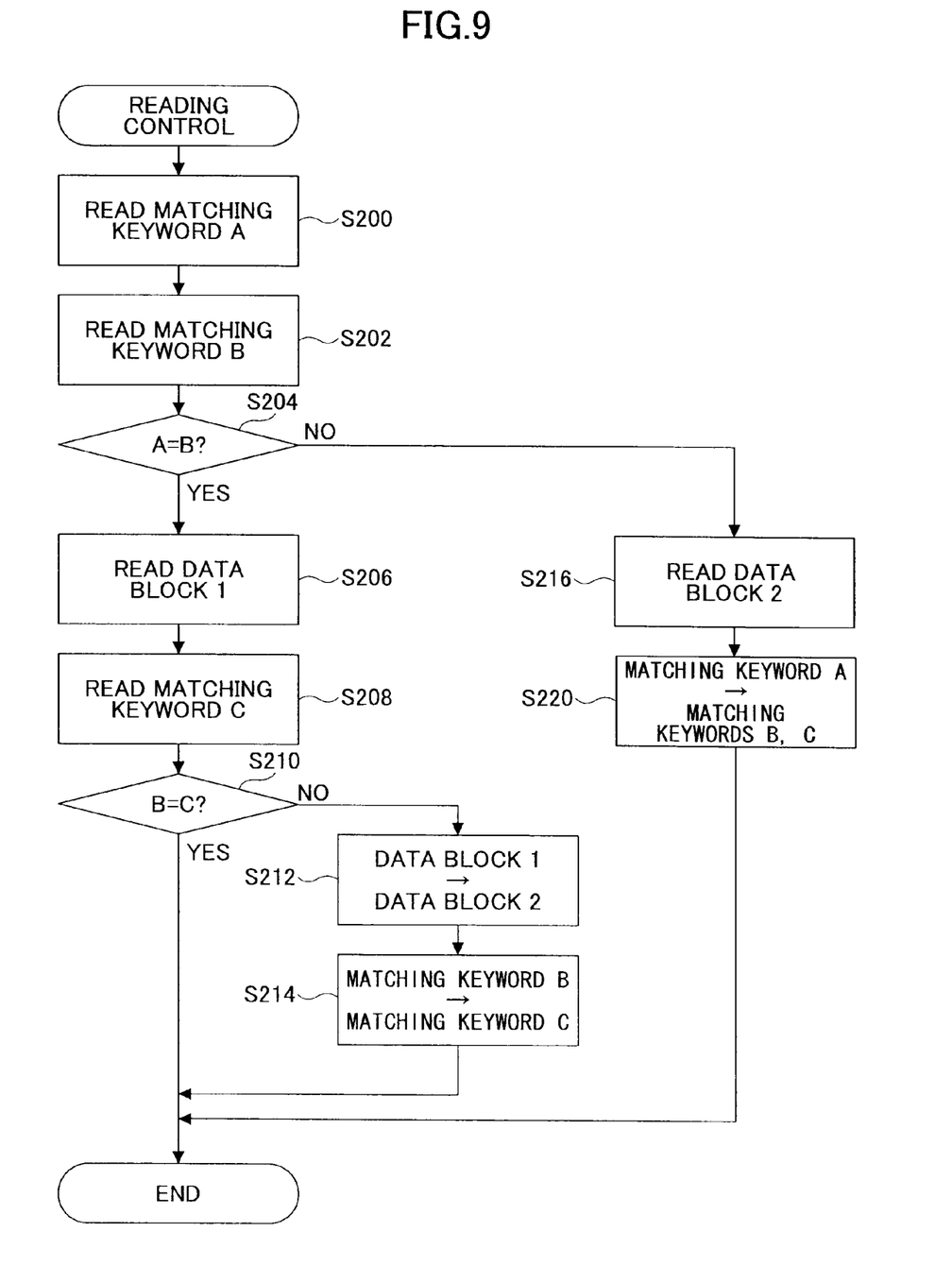
FIG. 9 shows another example of a process flow of the reading control which is executed by the micro computer.

The correction process of the matching keyword may be executed after S216. In this case, the matching keywords B and C are replaced by the matching keyword A. FIG. 9 shows a process flow of the case as described above. According to FIG. 9, the micro computer 10 reads data block 2 (S216) and replaces the matching keywords B and C by the matching keyword A (S220), in a case where the matching keyword A and the matching keyword B do not correspond to each other.

Even though the number of times of memory access increases in the reading control, by doing this, it becomes possible to suppress data loss more effectively.

Figure 10:
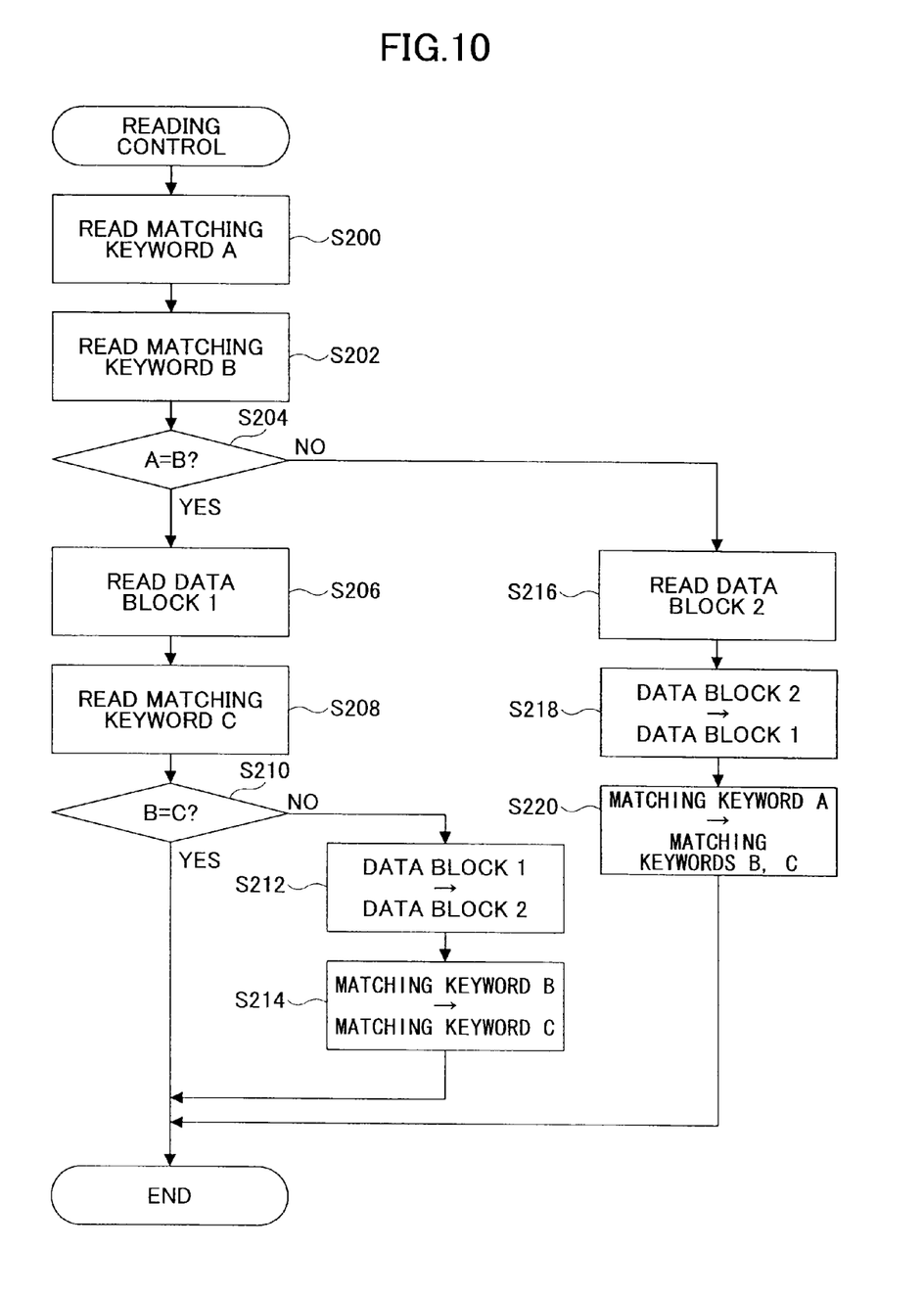
FIG. 10 shows another example of a process flow of the reading control which is executed by the micro computer.

In a case where data block 2 is selected, data block 1 may be recovered and the correction process of the matching keyword may be executed after S216. FIG. 10 shows a process flow of the case as described above. According to FIG. 10, the micro computer 10 reads data block 2 (S216), replaces data block 1 by data block 2 (S218) and replaces the matching keywords B and C by the matching keyword A (S220), in a case where the matching keyword A and the matching keyword B do not correspond to each other.

Even though the number of times of memory access increases in the reading control, by doing this, it becomes possible to suppress data loss more effectively.

INDUSTRIAL APPLICABILITY

The present invention can be widely applied to the computer industry, the transportation industry such as the automobile industry or the like, and the automotive parts industry thereof.

DESCRIPTION OF REFERENCE NUMERALS

1 information management apparatus
10 micro computer
12 counter
20 nonvolatile memory
30 communication wire
32 address bus
34 data bus

The invention claimed is:

1. An information management apparatus for managing data comprising:
    a rewritable nonvolatile memory; and
    a memory controller configured to control inputting information into and outputting information from the nonvolatile memory,
    wherein the memory controller stores data, the data including
        a first validity check information,
        a first data body,
        a second validity check information,
        a second data body having the same data as the first data body, and
        a third validity check information
    arranged in the above order, in a designated address area in the nonvolatile memory when the memory controller performs a writing control in which the memory controller writes the data in the nonvolatile memory,
        wherein the memory controller selects the second data body and recovers the first data body by replacing the first data body with the second data body in a case where the first validity check information does not correspond to the second validity check information under a reading control, and
        wherein the memory controller selects the first data body and recovers the second data body by replacing the second data body with the first data body in a case where the first validity check information corresponds to the second validity check information and the third validity check information does not correspond to the first validity check information or the second validity check information under the reading control.

2. The information management apparatus according to claim 1, wherein the memory controller writes the same information in the nonvolatile memory as the first validity check information through the third validity check information under the writing control, and selects any one of the first data body and the second data body based on sameness of the first validity check information through the third validity check information with other validity check information under the reading control.

3. The information management apparatus according to claim 2, wherein the first validity check information through the third validity check information are count values generated by a counter.

4. The information management apparatus according to claim 2, wherein the first data body and the second data body are learning values obtained through control of a device mounted on a vehicle, wherein the writing control is performed at the end of controlling a vehicle system, and wherein the reading control is performed when the vehicle system is started.

5. The information management apparatus according to claim 1, wherein the first validity check information through the third validity check information are count values generated by a counter.

6. The information management apparatus according to claim 5, wherein the first data body and the second data body are learning values obtained through control of a device mounted on a vehicle, wherein the writing control is performed at the end of controlling a vehicle system, and wherein the reading control is performed when the vehicle system is started.

7. The information management apparatus according to claim 1, wherein the first data body and the second data body are learning values obtained through control of a device mounted on a vehicle, wherein the writing control is performed at the end of controlling a vehicle system, and wherein the reading control is performed when the vehicle system is started.

8. An information managing method executed by a computer for managing data stored in a rewritable nonvolatile memory, comprising:

storing data, the data including
a first validity check information,
a first data body,
a second validity check information,
a second data body having the same data as the first data body, and
a third validity check information that are arranged in the above order, in a designated address area in the nonvolatile memory; and reading the stored data, including:
determining whether the first validity check information corresponds to the second validity check information and whether the third validity check information corresponds to the first or the second validity check information,
selecting the second data body in a case where the first validity check information does not correspond to the second validity check information and selecting the first data body in a case where the first validity check information corresponds to the second validity check information and the third validity check information does not correspond to the first or the second validity check information, and
recovering the first data body by replacing the first data body by with the second data body in a case where the second data body is selected and recovering the second data body by replacing the second data body by the first data body in a case where the first data body is selected.

9. The information managing method according to claim 8, wherein the same information is written in the nonvolatile memory as the first validity check information to the third validity check information in the storing the data, and wherein any one of the first data body and the second data body is selected based on sameness of the first validity check information through the third validity check information with other validity check information in the selecting.

10. The information managing method according to claim 9, wherein count values generated by a counter are stored in the nonvolatile memory as the first validity check information through the third validity check information.

11. The information managing method according to claim 9, wherein the computer and the rewritable nonvolatile memory are mounted on a vehicle, wherein the first data body and the second data body are learning values obtained through a control of a device mounted on the vehicle, wherein the storing the data is performed at the end of controlling a vehicle system, and wherein the reading the data is performed when the vehicle system is started.

12. The information managing method according to claim 8, wherein count values generated by a counter are stored in the nonvolatile memory as the first validity check information through the third validity check information.

13. The information managing method according to claim 12, wherein the computer and the rewritable nonvolatile memory are mounted on a vehicle, wherein the first data body and the second data body are learning values obtained through a control of a device mounted on the vehicle, wherein the storing the data is performed at the end of controlling a vehicle system, and wherein the reading the data is performed when the vehicle system is started.

14. The information managing method according to claim 8, wherein the computer and the rewritable nonvolatile memory are mounted on a vehicle, wherein the first data body and the second data body are learning values obtained through a control of a device mounted on the vehicle, wherein the storing the data is performed at the end of controlling a vehicle system, and wherein the reading the data is performed when the vehicle system is started.

* * * * *